(12) United States Patent
Spertus et al.

(10) Patent No.: US 6,518,979 B1
(45) Date of Patent: Feb. 11, 2003

(54) AUTOMATICALLY-MAINTAINED CUSTOMIZABLE USER INTERFACES

(75) Inventors: Michael P. Spertus, Chicago, IL (US); Charles Fiterman, Deerfield, IL (US)

(73) Assignee: Geodesic Systems, Incorporated, Chicago, IL (US)

(*) Notice: Subject to any disclaimer, the term of this patent is extended or adjusted under 35 U.S.C. 154(b) by 0 days.

(21) Appl. No.: 09/402,815

(22) PCT Filed: Apr. 29, 1998

(86) PCT No.: PCT/US98/08643
§ 371 (c)(1),
(2), (4) Date: May 30, 2000

(87) PCT Pub. No.: WO98/49613
PCT Pub. Date: Nov. 5, 1998

Related U.S. Application Data
(60) Provisional application No. 60/045,118, filed on Apr. 30, 1997.

(51) Int. Cl.[7] .................................. G06F 15/00
(52) U.S. Cl. ........................ 345/762; 345/747
(58) Field of Search ............... 345/333, 334, 345/335, 336, 346, 744, 746, 747, 745, 762–763, 821–826

(56) References Cited

U.S. PATENT DOCUMENTS

| | | | | |
|---|---|---|---|---|
| 5,689,286 A | * | 11/1997 | Wusofski | 345/348 |
| 5,929,851 A | * | 7/1999 | Donnelly | 345/762 |
| 5,950,001 A | * | 9/1999 | Hamilton et al. | 395/701 |
| 6,118,446 A | * | 9/2000 | Jones et al. | 345/333 |
| 6,141,006 A | * | 10/2000 | Knowlton et al. | 345/335 |
| 6,189,138 B1 | * | 2/2001 | Fowlow et al. | 717/1 |
| 6,189,143 B1 | * | 2/2001 | Simonyi | 717/7 |
| 6,222,537 B1 | * | 4/2001 | Smith et al. | 345/333 |

* cited by examiner

*Primary Examiner*—Steven Sax
(74) *Attorney, Agent, or Firm*—Gordon E. Nelson

(57) ABSTRACT

Techniques for providing interactive user interfaces for programming constructs. A programming construct is associated with one or more metaphors (837) that specify interactive user interfaces (807) for the programming construct. Thus, a programming construct may have a metaphor for a text-based user interface or for one or more different graphical user interfaces. The metaphor may be associated with a description of the construct such as that found in an abstract syntax tree (823), and the metaphor may obtain the information it needs to construct the interface from the description, so that the user interfaces automatically track changes in the programming construct. Also included is apparatus for modifying the metaphor. In one implementation, a build form function (1407) is used to read the information needed to construct the construct's user interface from the construct's description and the metaphor is modified by modifying the build form function. In the implementation, parameter values received via the user interface are incorporated into an abstract syntax tree that represents the construct.

19 Claims, 14 Drawing Sheets

ABSTRACT SYNTAX TREE NODES 115

FIG. 3

```
┌─────────────────────────────────────────────┐
│ □         CREATEEMPLOYEE                    │
├─────────────────────────────────────────────┤
│ TO CREATE A NEW EMPLOYEE, COMPLETE THE      │
│ FOLLOWING STEPS.                            │
│                                             │
│ 1. ENTER THE EMPLOYEE'S NAME         [    ] │
│                                             │
│ 2. ENTER THE EMPLOYEE'S SALARY       [    ] │
│                                             │
│ 3. ENTER THE EMPLOYEE'S JOB DESCRIPTION [ ] │
│                                             │
└─────────────────────────────────────────────┘
```

303 — TO CREATE A NEW EMPLOYEE, COMPLETE THE FOLLOWING STEPS.

```
┌─────────────────────────────────────────────┐
│ □         CREATEEMPLOYEE                    │
├─────────────────────────────────────────────┤
│ TO CREATE A NEW EMPLOYEE, COMPLETE THE      │
│ FOLLOWING STEPS.                            │
│                                             │
│ 1. ENTER THE EMPLOYEE'S NAME [        ]     │
│                                             │
│ 2. ENTER THE EMPLOYEE'S SALARY  [18,000]    │
│                                             │
│ 3. ENTER THE EMPLOYEE'S JOB DESCRIPTION [ ] │
│                                             │
│          [ OK ]        [ Cancel ]           │
└─────────────────────────────────────────────┘
```

403, 405, 407, 401

FIG. 6 raiseEmployeeSalary: ⎫
 :in employee ⎬ 601
 raise: in opt percentage <-15% ⎭
 employee's Salary *<-1 + raise } 611
 613

(labels: 603, 605, 607, 609)

FIG. 10

| | |
|---|---|
| CONTROL TYPE | 1001 |
| WINDOWS PARENT PTR | 1003 |
| ID | 1005 |
| ATEXT | 1007 |
| CURSOR X | 1009 |
| CURSOR Y | 1011 |
| WINDOW WIDTH | 1013 |
| WINDOW HEIGHT | 1015 |
| AWORD | 1019 |
| ABOOL | 1021 |
| GROUP BOX PTR. | 1023 |
| WINDOWS CTL. PTR. | 1027 |
| BLOCK PTR. | 1029 |

CONTROL INFO 905

FIG. 15

```
MAIN ( )                   ~1503
{                          ~1505
  C c;                     ~1509
  WINSTREAM wln;
         ~1507
  1511~ wln >> c;   // DISPLAY A FORM FOR INITIALIZING c AND HAVE
              1513                THE USER FILL IT IN.
  c.PROCESS ( )    // DO ANY DESIRED PROCESSING OF c
  wln << c;   ~1515  // DISPLAY THE RESULT
}
1501
```

AUTOMATICALLY-MAINTAINED CUSTOMIZABLE USER INTERFACES

CROSS-REFERENCE TO RELATED APPLICATIONS

The present patent application claims priority from provisional application U.S. Ser. No. 60/045,118, Michael P. Spertus, Programming System, filed Apr. 30, 1997 pending.

BACKGROUND OF THE INVENTION

1. Field of the Invention

The invention concerns systems for specifying computer-executable programs generally and more specifically concerns techniques for specifying user interfaces in such programs.

2. Description of Related Art

The user interface for a computer program defines the manner in which a user of a program interacts with the program. Most generally, the program causes the computer system to output information to an output device such as a display or a loudspeaker and then wait for input from the user. The user provides the input via an input device such as a keyboard, pointing device, or microphone, and when the program receives the input, it may respond by causing the computer system to again output information and wait for input.

Historically, there have been two main classes of user interfaces: text-based user interfaces and graphical user interfaces. In text-base user interfaces, the program outputs text to a display device and the user responds to the text output by the program by inputting text from a keyboard. In graphical user interfaces, the program outputs a graphical display that includes elements such as icons, menus, and scroll bars as well as text and the user provides input to the program by using a pointing device to manipulate the elements of the graphical user interface, as well as by inputting text from the keyboard. There are many different kinds of graphical user interfaces. Graphical user interfaces have been developed for different kinds of operating systems; in addition, there are operating system-independent graphical user interfaces and lately, new kinds of graphical user interfaces have been developed for the World Wide Web and have then been used as general-purpose graphical user interfaces.

With highly interactive programs such as word processors or spread sheets, a major part of the programming effort is dedicated to programming the user interface. That is particularly the case when the user interface is a complex graphical user interface. Various techniques have been developed over the years to reduce the amount of effort required to program a user interface. One technique is to provide the programmer with a toolkit for programming the user interface. For example, the toolkit will include functions which provide a highlevel interface for an entity in the user interface such as a scroll bar, and the programmer can use the high-level functions to define and manipulate the scroll bar instead of programming the scroll bar himself from the primitive of the graphical user interface. Another technique is to provide the programmer with an application generator for the user interface. The application generator is a program which generates skeleton code for the user interface. The programmer can then modify the skeleton as needed for his or her particular interface.

While tool kits and application generators can reduce the labor involved in programming a user interface, they cannot solve a basic problem: the user interface is simply part of the program, and any time a programmer makes a change in a program, the programmer must also be sure that he or she has made all of the changes in the user interface that are required by the change in the underlying program. For instance, if a function receives the values of its parameters from the user via an interactive user interface and the programmer adds a parameter to the function or deletes a parameter from it, the programmer must change the user interface code that provides the user interface for the function to take the change in the number of parameter values into account.

The need to make sure that changes in the user interface tracks changes in the program is lessened if the user interface is the starting point for the programming. This is the case when forms-based programming environments such as that provided by Microsoft Visual Basic are used. In such environments, the programmer designs a form and then writes code which is executed when an event occurs in the form. Even with such systems, however, it is still necessary to make sure that the code for the form is reworked when the form is redesigned and that a change in the code does not require a reworking of the form itself.

The user interface for the program automatically tracks changes in the program in programming environments where the interface used to write the program is the same as the interface the user employs to interact with the program. One example of this is that provided by interpreted languages such as LISP. In LISP, the syntax for interactively invoking a function from a terminal is exactly the same as the syntax for invoking the function within another LISP function, and as the function's interface changes, so does the syntax for invoking it from the terminal. Unfortunately, the only user interface available to the programmer is that defined by the LISP language, and LISP code is notoriously hard to read. Other examples are provided by visual programming languages such as Prograph. It is common practice in programming environments to represent a program internally in the programming environment by means of an abstract syntax tree. With programs written in textual languages, the programming environment produces the abstract syntax tree from the text of the program; in the visual programming languages, the programmer works with a visual representation of the abstract syntax tree and modifies the program by modifying the visual representation of the abstract syntax tree. Any modification of the program thus cannot help but be reflected in the user interface. Again, the only user interface available to the programmer is the visual representation of the syntax tree. Of course, for the non-programmer user, this syntax tree interface is almost as intimidating as LISP code.

What is needed is a way of making user interfaces for programs that provides easy-to-use user interfaces that track changes in the program in the same fashion as the user interfaces for LISP or Prograph. It would be further advantageous if such user interfaces were customizable, if a given program could be easily given different kinds of user interfaces, and if a new user interface could be retrofitted to a preexisting program without changing the code of the preexisting program. It is an object of the techniques disclosed herein to provide ways of making user interfaces that have some or all of the foregoing advantages.

SUMMARY OF THE INVENTION

The techniques for making user interfaces that have these advantages include associating a plurality of interactive user interface metaphors with a description of a programming construct such as an abstract syntax tree for the programming construct and generating a specified one of the interactive user interfaces from the interactive user interface metaphor corresponding to the specified interactive user interface. A metaphor may specify a textual interactive user interface or a graphical user interface, and different metaphors may correspond to different systems for providing interactive user interfaces. The user interface may be generated when the programming construct is activated or code for the user interface may be generated when the programming construct is compiled.

In other aspects, the techniques may include modifying the interactive user interface by editing the metaphor used to generate it and using the metaphor to generate the graphical user interface from information in the description, thereby assuring that any change in the programming construct that affects the interactive graphical user interface automatically results in a corresponding change in the associated interactive user interfaces. Where the programming construct is a class, metaphors associated with the class are inherited. The interactive user interface may be used to obtain parameter values for the programming construct, and when the description of the construct is an abstract syntax tree, the parameter values are incorporated into the abstract syntax tree.

The foregoing and other objects and advantages of the invention will be apparent to those skilled in the arts to which the invention pertains upon perusal of the following Detailed Description and drawing, wherein:

BRIEF DESCRIPTION OF THE DRAWINGS

FIG. 3 shows a first customized form;

FIG. 4 shows a second customized form;

FIG. 6 shows how forms are used to show parameter values used in other forms;

FIG. 10 is a diagram of control information;

FIG. 15 is source code for a C++ program that employs a forms metaphor.

Figure 1:
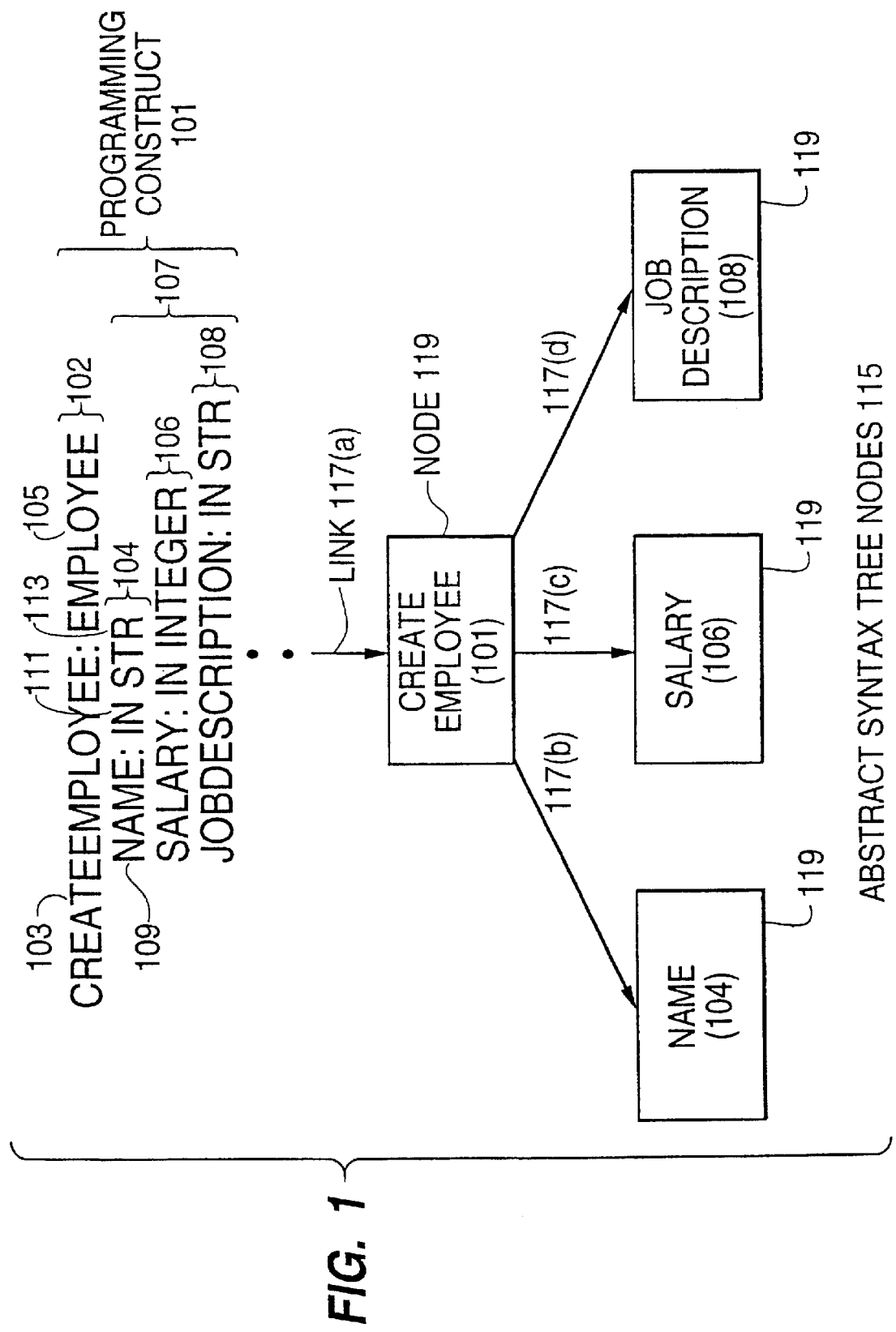
FIG. 1 shows how an abstract syntax tree represents a programming construct.

The reference numbers in the drawings have at least three digits. The two rightmost digits are reference numbers within a figure; the digits to the left of those digits are the number of the figure in which the item identified by the reference number first appears. For example, an item with reference number 203 first appears in FIG. 2.

DETAILED DESCRIPTION

The following Detailed Description begins with an overview of how metaphors can be used with programs to provide user interfaces for programs that are easy to make and that automatically adjust to changes in the program. It then describes an implementation of metaphors in the Braid programming language.

Programming Constructs and Abstract Syntax Trees

Programs written in high-level languages are made up of programming constructs. A programming construct is a portion of a program that defines an entity in the program. FIG. 1 shows a typical programming construct 101. Programming construct 101, written in the Braid language, defines the interface for a CreateEmployee function 103 which creates and returns an employee record of type Employee 105. The function takes three parameters: the employee's name name in line 105, the employee's salary salary in line 106, and the employee's job description jobDescription in line 108. As shown in line 104, each parameter has a name and a definition consisting of an indication 111 of whether the parameter is an input or output parameter (in 111 of course indicating an input parameter) and the parameter's type 113 (here, a string type, as indicated by str.

There are two ways in which a program written in a high-level language may be executed: by using a program called an interpreter to interpret the program's text to produce a stream of instructions for a computer which the computer executes as they are produced or by using a program called a compiler to compile the program's text to produce object code, that is, a program of instructions for the computer which causes the computer to perform the actions specified in the high-level language program's text. To "execute" the high-level language program, one executes the object code made by the compiler. In some cases, parts of the high-level language program may be compiled and other parts may be interpreted.

Most compilers and interpreters produce an abstract syntax tree that represents the high-level language program and then use the abstract symbol tree to produce the stream of instructions or the object code. Each programming construct in the program appears as one or more nodes in the abstract syntax tree. The abstract syntax tree nodes 119 for programming construct 101 is shown at 115 in FIG. 1. There are three nodes 119, one representing the entire programming construct 101 and one representing each of the parameters. The part of the programming construct represented by the node is indicated by the number in parentheses in the node. The node representing construct 101 is the parent of the nodes representing the parameters, those nodes being children of the node representing construct 101. As indicated by link 117(*a*), the node representing construct 101 is itself a component of another construct, and consequently a child of the node representing that construct. For a discussion of abstract syntax trees and how they are used to represent programming constructs, see Aho, et al., *Compilers: Principles, Techniques*, and *Tools*, Addison-Wesley, 1985, p. 49.

Figure 2:
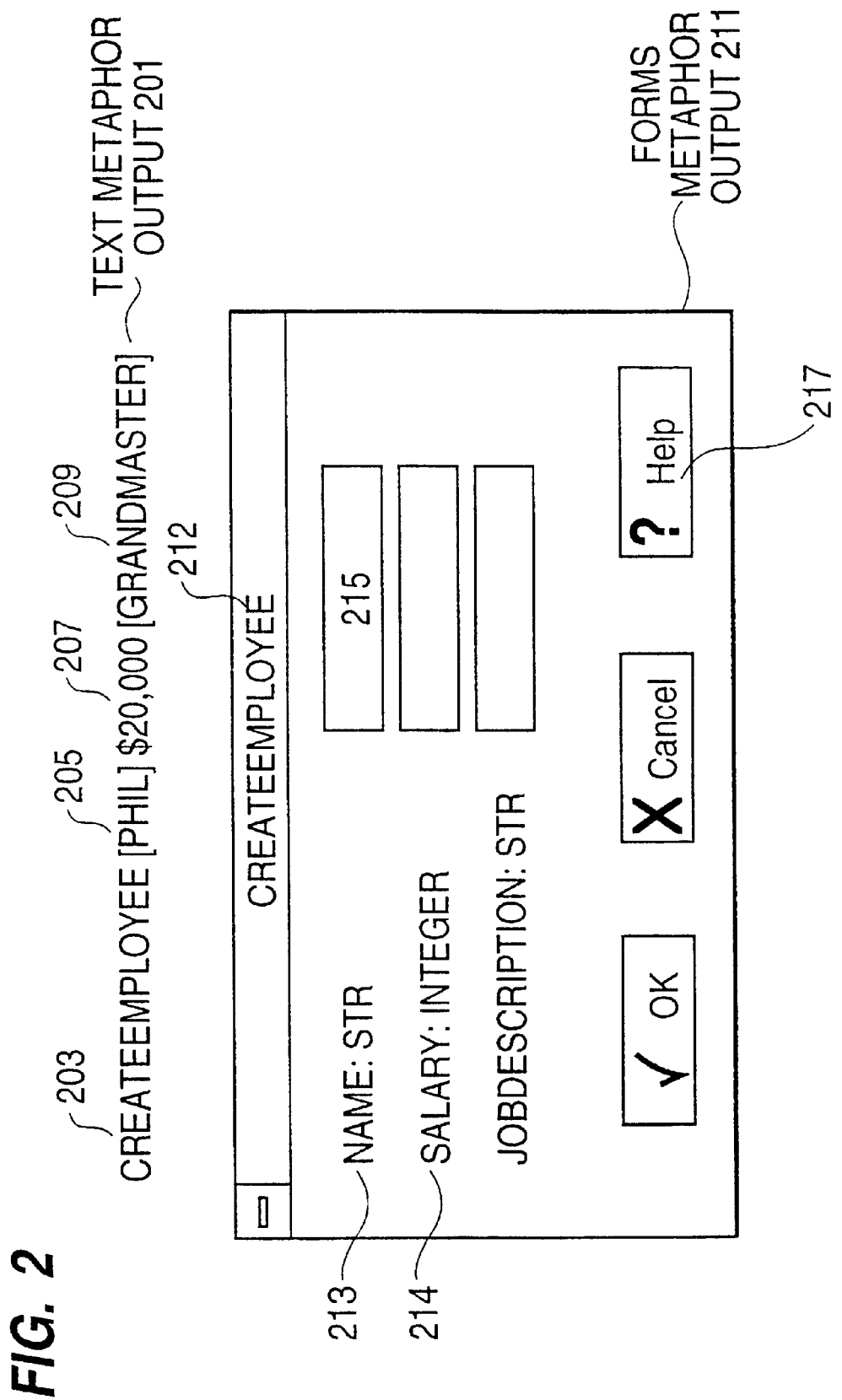
FIG. 2 shows output of a text metaphor and of a form metaphor.

Using Abstract Syntax Trees and Metaphors to Produce User Interfaces: FIG. 2

When a program written in a high-level language uses metaphors to construct its user interface, the representation of the programming construct in the abstract syntax tree is used not only to produce code for execution, but also to produce the user interface for the construct. FIG. 2 provides an example of this for CreateEmployee programming construct 101. FIG. 2 shows two different user interfaces for CreateEmployee: one at 201 that is output by text metaphor and one at 211 that is output by a forms metaphor.

The text metaphor is used when the interactive user interface for the program is an interface that accepts and produces only lines of text. In such an interface, the CreateEmployee function is called by typing CreateEmployee followed by values required for the parameters. The values must be in the order in which the parameters appear in construct 101, that is, the value for name, the value for salary, and the value for jobDescription must appear in that order. In the text interface used in Braid, character strings are indicated by brackets and number data is unbracketed. The text metaphor reads nodes 115 for CreateEmployee and determines from the information contained in them that a valid invocation must have the form shown at 201. If the user does not get the syntax of the invocation right, the text metaphor can read nodes 115 and use the information in them to produce useful error messages. In some embodiments, the text metaphor can read the nodes and use them to produce an invocation for the function with blanks for the information to be filled in by the user, thus reducing syntax errors.

The forms metaphor also uses syntax tree nodes 115 for CreateEmployee to generate an interactive user interface for the function, but this time, the user interface is not a text interface, but a graphical user interface. The forms metaphor uses the information in syntax tree nodes 115 to produce the form shown at 211 The name of the function appears at 212 as the title of the form and there is a box 215 in which the user can input a value for each parameter. Each box 215 has a label 213 which is taken from the name and type information for the parameter in the parameter's node of the syntax tree. At the bottom of the form are standard graphical user interface (GUI )buttons 217. OK causes CreateEmployee to be called using the information specified in the boxes 215, thereby causing an, Cancel cancels the operation, and Help provides the user with help. Because form 211 is produced from the information in abstract syntax tree nodes 115, Help can use the information in nodes 115 in providing help.

FIG. 2 thus shows how metaphors can be employed to produce both a text user interface and a forms user interface for the CreateEmployee programming construct.

Metaphors can also be used to deal with the fact that there are many different systems for producing GUIs. Form 211 is for a GUI of the type provided by the Windows® operating system, but different forms metaphors can be built for different GUIs, so that a given programming construct can easily be given user interfaces for different GUIs. An important characteristic of any user interface, text or GUI, made using metaphors is that the user interface automatically changes as the program changes. The reason for this is that the information that the metaphor uses to produce the user interface comes from the abstract syntax tree and the abstract syntax tree changes every time the program does. A user interface for a programming construct that is made using a metaphor can further be interpreted or compiled. When it is interpreted, the program uses the abstract syntax tree and the metaphor to produce the user interface whenever it is needed; when it is compiled, the compiler for the program uses the abstract syntax tree and the metaphor to produce object code for the user interface. It should be noted here that the metaphor for a programming construct can be associated with any entity that represents the programming construct, that has the information necessary to produce the user interface made by the metaphor, and that changes whenever the program changes.

Figure 5:
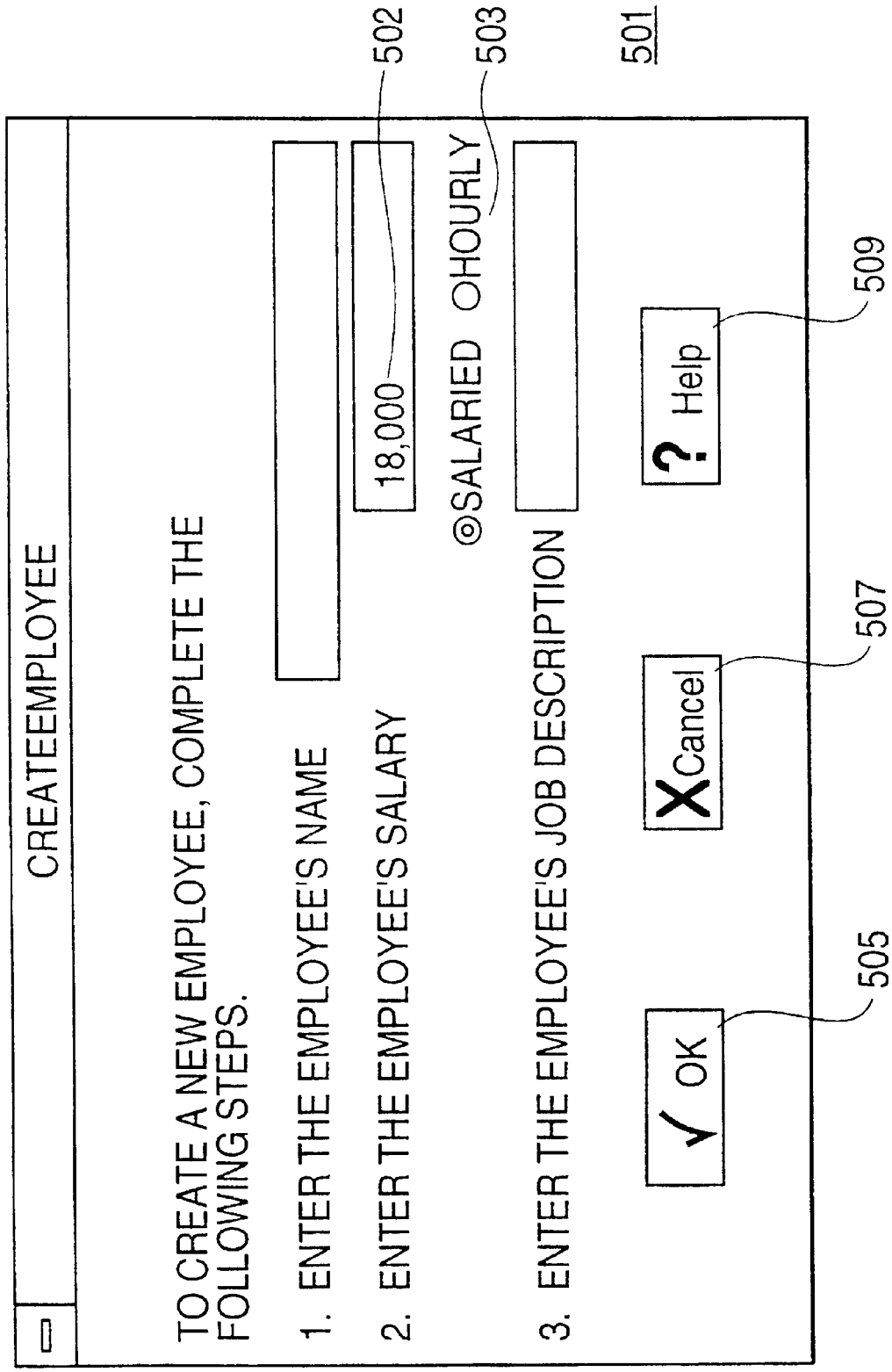
FIG. 5 shows a third customized form.

Advantages of Associating Metaphors with Programming Constructs: FIGS. 3–5

As mentioned in the Description of Related Art above, programming systems exist in which the programming system prescribes user interfaces for programming constructs in the language used in the programing system. A problem with such systems is that the user interface is defined for all programming constructs and therefore cannot be modified for particular programming constructs. Each metaphor, by contrast, is associated with a particular programming construct, for instance the CreateEmployee function of our example. Because that is the case, the metaphor can be edited to produce a user interface that is particular to the programming construct. In a preferred embodiment, the user can place the metaphor in an edit mode, and when the metaphor is in edit mode, the user can edit the interface presently being produced by the metaphor and the metaphor will from that point on produce the interface as edited.

FIGS. 3–6 show examples of forms produced by edited metaphors. Form 301 of FIG. 3 has prompts 303; form 403 of FIG. 4 has buttons 407, resized fill-in boxes, and a default value 405 in addition to the prompts. The default automatically appears in the box, but the user may alter it. Form 501 of FIG. 5 has a default value for the salary at 502. The form further has buttons 505 through 509, which function as described above, and radio buttons 503 for indicating whether the employee is paid on an hourly or salary basis.

Metaphors and Inheritance: FIG. 5

A feature of modem high-level programming languages such as Braid, C++, and Java™ is inheritance. A programming construct may be defined using other previously-defined programming constructs, and the characteristics of the previously-defined programming construct are inherited by the new programming construct and can be modified and/or extended in the new construct. In a preferred embodiment, a metaphor defined for a first programming construct may be inherited by a second programming construct that is defined using the first programming construct. For example, the radio buttons 503 of FIG. 5 are used to set a new parameter of CreateEmployee, one which has an enumerated class, that is, the class of the parameter defines it as being able to have one of two values, "Salaried" or "Hourly". A metaphor which produces the radio buttons produced at 503 may be defined for the programming construct which defines the enumerated class, and when the parameter is given the enumerated class, it inherits the metaphor that produces radio buttons 503. That metaphor can of course be modified for the particular parameter represented by radio buttons 503. A metaphor can thus be defined once and inherited everywhere the construct the metaphor is defined for is used.

Figure 7:
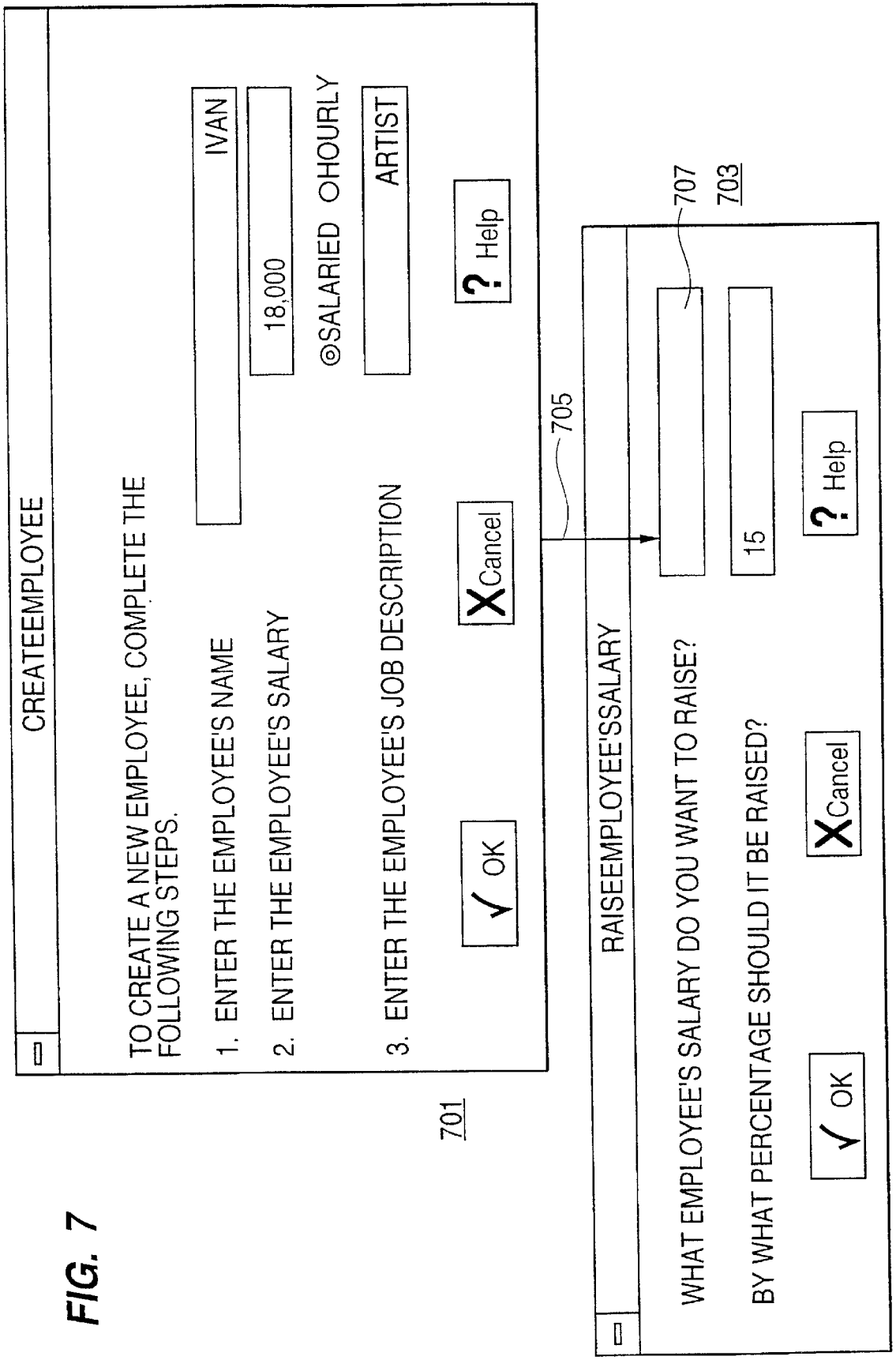
FIG. 7 shows the forms that are displayed when the program construct of FIG. 6 is executed.

Using Values Input Using One Metaphor in Another Metaphor: FIGS. 6 and 7

It often happens in programs that values represented by one programming construct are used in another programming construct. FIG. 6 shows a raiseEmployeeSalary procedure 613 which takes two parameters 601, a value 603 of type employee and a value raise of type percentage. percentage has an optional default value of 15%, as shown at 605, 607, and 609. The computation is done at line 611: the value Salary in the record represented by the employee parameter is multiplied by 1+ the value of raise.

FIG. 7 shows how the forms metaphors for CreateEmployee and RaiseEmployeeSalary cooperate when RaiseEmployeeSalary is invoked. Form 701 for the employee specified in employee parameter 603 appears as does form 703 for this invocation of RaiseEmployeeSalary, and an arrow 705 points from form 701 to box 707 of form 703. Box 707 of course receives the employee record for the employee whose pay is going to be increased, and arrow 705 indicates that the employee record used to create form 701 is the value being input as a parameter at box 707.

An Implementation of Metaphors

Metaphors have been implemented as part of the Braid programming system. For purposes of the present discussion, all that need be known about Braid is that it permanently maintains copies of abstract syntax trees for Braid programming constructs in a Braid data base, that it associates many different kinds of information, including metaphors, with the abstract syntax trees, and that how the information is used depends on which of a number of execution environments the Braid programming system is operating in. Among the environments are run time, compile time, test time, document time, parse time, and others created by users. For example, if the programming system is being used to compile a programming construct represented in the abstract syntax tree, it is in the compile time environment. If the programming system is being used to prepare documentation for such a programming construct, it is in the documentation time environment.

Figure 8:
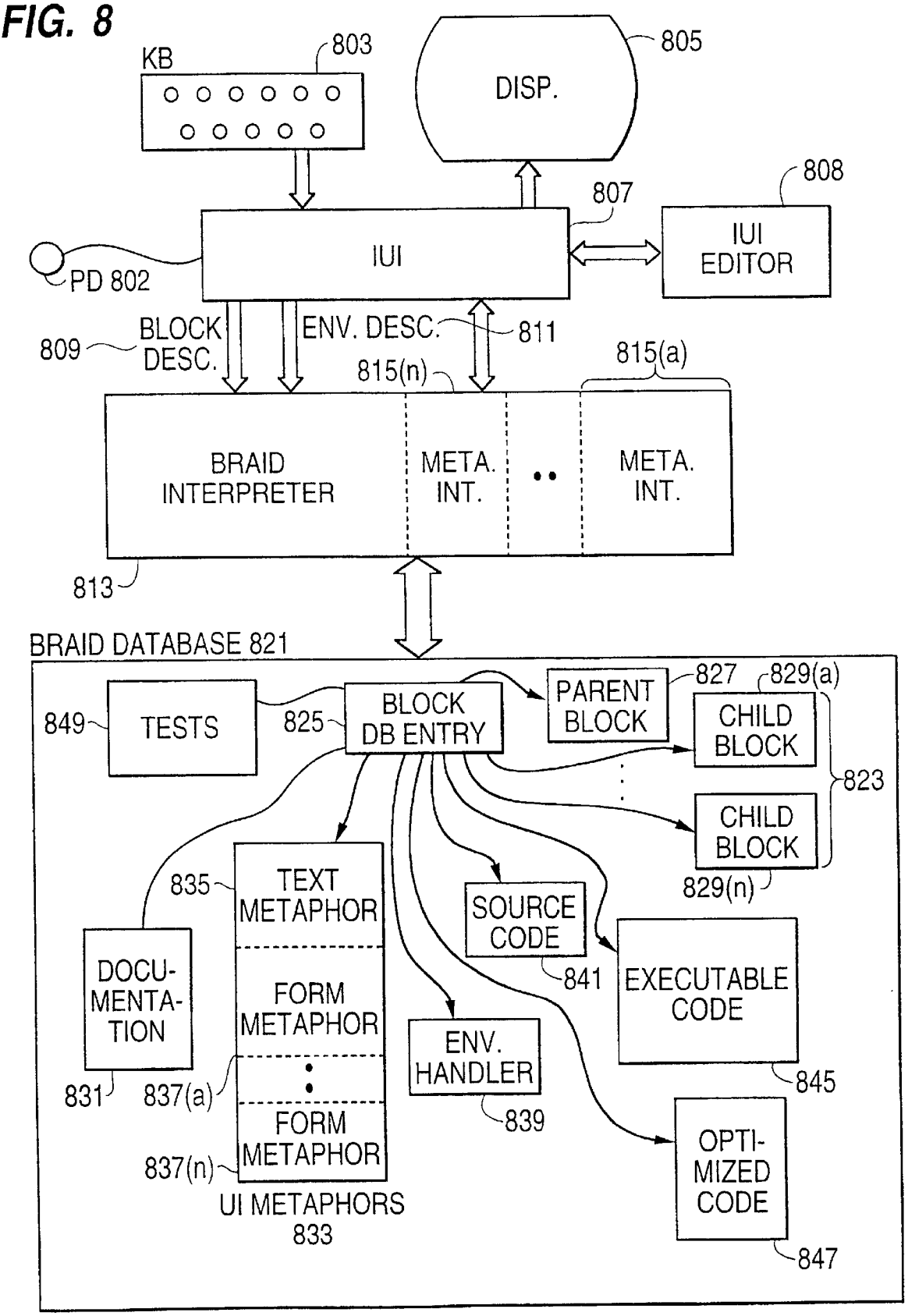
FIG. 8 is an overview of the Braid programming environment.

FIG. 8 shows a Braid programming environment 801. Programming environment 801 is implemented on a computer system with input/output devices including a pointing device 802, for example, a mouse, a keyboard 803, and a display 805. When braid programming environment is operating, a braid interpreter 813 is executing on the computer system. Routines in an interactive user interface 807 operate to receive input from keyboard 803 and mouse 802 and provide it to Braid interpreter 813 and to receive output from braid interpreter 813 and provide it to display 805. Interactive user interface 807 is typically a component of the computer system that the Braid programming environment is operating on, and depending on the computer system, the interactive user interface it creates may be a text interface or one of a number of graphical user interfaces, IUI 807 also includes an IUI editor 808, which permits programmers to edit the user interface by editing the data used to generate the user interface. An example of an IUI editor 808 is the Microsoft Developer Studio Resource Editor, which permits a programmer to edit the data from which the Microsoft Windows® operating system constructs the windows used in its GUI.

Braid interpreter 813 operates on Braid data base 821, which contains abstract syntax trees for Braid programming constructs, information associated with the abstract syntax trees that is used in the various execution environments, and metaphors that define the user interfaces produced by IUI 807 for programming constructs. Arrows in data base 821 indicate associations among information. Continuing in more detail with Braid data base 821, shown in the data base is an abstract syntax tree 823 consisting of block 825, its parent block 827, and a number of child blocks 829. Each block of course corresponds to a Braid programming construct. Many different kinds of information may be associated with a block. Shown associated with block 825 are tests 849 for the programming construct represented by the block, documentation 831 for the construct, source code 841 for the construct executable code 845 for it, optimized executable code 847, environment handler 839, and user interface metaphors 833. Environment handler 839 determines how the various kinds of information associated with block 825 are used in the different execution environments. For example, at run time, environment handler 825 will respond to an invocation of the construct represented by block 825 by executing executable code 845. In operation, braid interpreter 813 receives a description 809 of a Braid block and a description 811 of an execution environment and operates on the abstract syntax tree for the Braid block as required for the execution environment.

Continuing in more detail with metaphors in system 801, associated with each Braid block is a set 833 of one or more user interface metaphors, including at least a text metaphor 835 and optionally including a set of one or more form metaphors 837($a$ . . . $n$). There may be a form metaphor for each of the GUI systems that may be used to provide an interactive user interface to the programming construct represented by block 825. Braid interpreter 813 contains a metaphor interpreter 815 for each of the user interfaces for which braid interpreter handles I/O.

Details of a Form Metaphor: FIGS. 9–12

Figure 9:
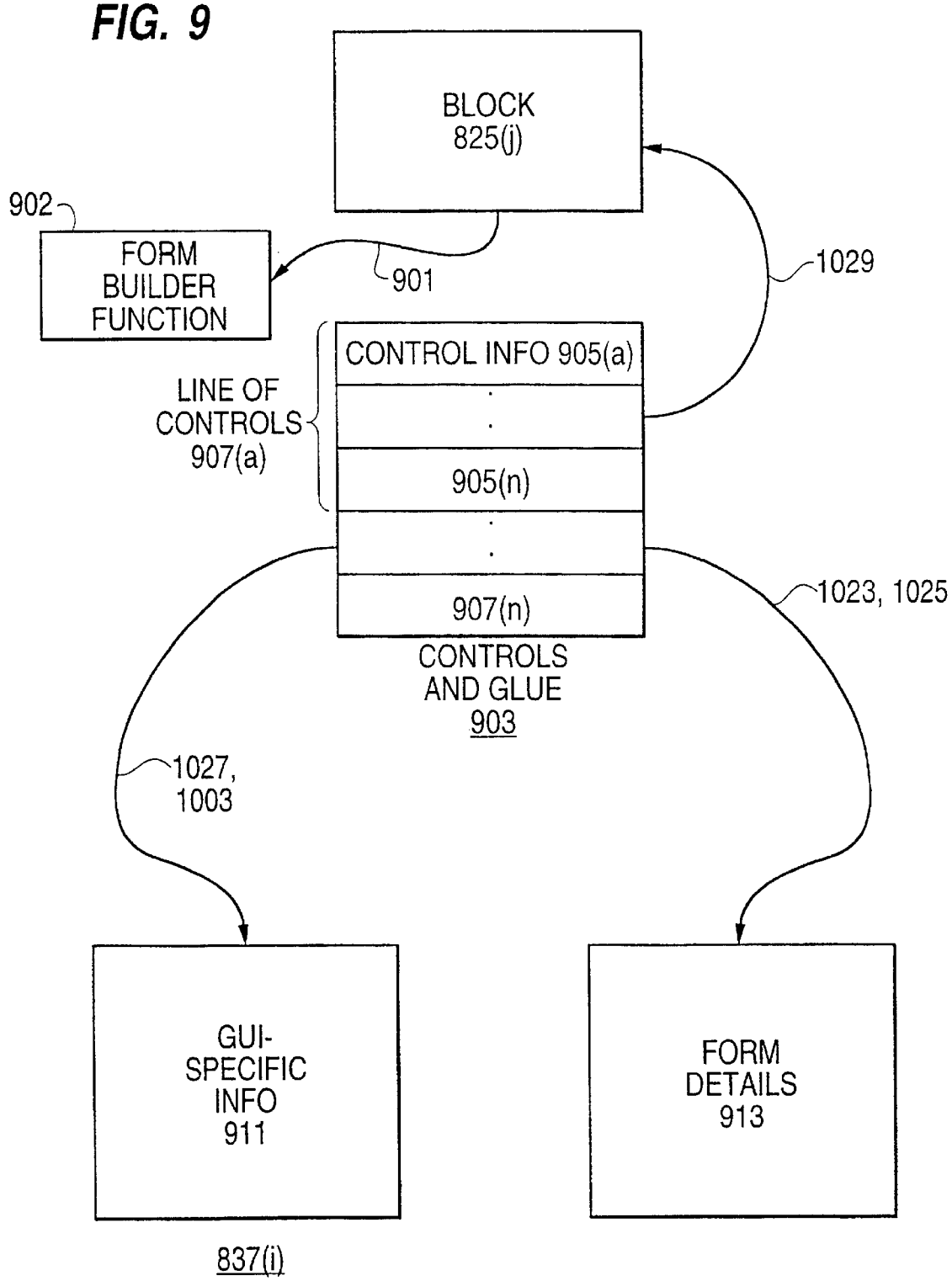
FIG. 9 is a diagram of a forms metaphor.

FIG. 9 shows the details of a preferred embodiment of a form metaphor. A block 825($j$) that represents a programming construct in abstract syntax tree 823 has associated with it information that is termed herein controls and glue that define a form metaphor that is associated with the programming construct represented by block 825($j$). The basic component of controls and glue 903 is control information 905, which is a data structure whose fields contain the information used to control the form associated with block 825($j$). A line of controls 907 is made up of one or more of the control information data structures, and controls and glue 903 is in turn made up of some number of lines of controls 907. Among the information that may be contained in a given item of control information 905($i$) are a pointer to block 825($j$) for which the control information contains information, pointers to GUI-specific information 911 that contains information specific to the GUI in which the interface corresponding to the form metaphor is being generated, and pointers to more detailed lines of controls 913 for form metaphors for particular kinds of parameters.

In a preferred embodiment, the association between block 825($j$) and its controls and glue 903 is established by means of a form builder function 902. The information in block 825($j$) includes a pointer 901 to form builder function 902. When form builder function 902 is executed, it creates controls and glue 903 for block 825($j$), and as previously discussed, as part of creating controls and glue, it includes a pointer 1029 to block 825($j$) in controls and glue. When a bock 825 is first created in the abstract syntax tree, it is given a default form builder function which generates default controls and glue 903. As will be explained in more detail in the following, metaphor 837($i$) for block 825($j$) is customized in a preferred environment by replacing the default form builder with a form builder that builds a version of controls and glue 903 that contains the information required for the customized form. For example, the default form builder function simply uses the name of the program construct that block 825($j$) represents as the title of the form; a customized form builder may provide a more informative title.

FIG. 10 is a detail of control information 905. The contents of specific fields depend on where control information 905 is used in form metaphor 837($i$).

Control type 1001 indicates the type of control information 1001 contained in control info 905. Types in a preferred embodiment include BUTTON, RADIOBUTTON, CHECKBOX, COMBOBOX, GROUPBOX, LISTBOX SCROLLBAR, EDIT, STATIC, USER.

Windows parent pointer 1003 points to the parent of the Windows window that will contain the form produced from the form metaphor;

ID 1005 is an identifier for the form;

Atext 1007 holds lines of text, for example, prompts;

cursor x 1009 and cursor y 1011 give the current position of the cursor in the window;

window width 1013 and window height 1015 are the current height and width of the window containing the form;

AWORD 1019 generally indicates the length of an item of controls and glue information;

Boolean value 1021 is used as a flag to indicate the beginning and end of groups of control info;

group box pointer 1023 is a pointer to data structures in form details 913, when the form requires such data structures; and block pointer 1029 is a pointer to the block 825 to which the metaphor belongs.

Figure 11:
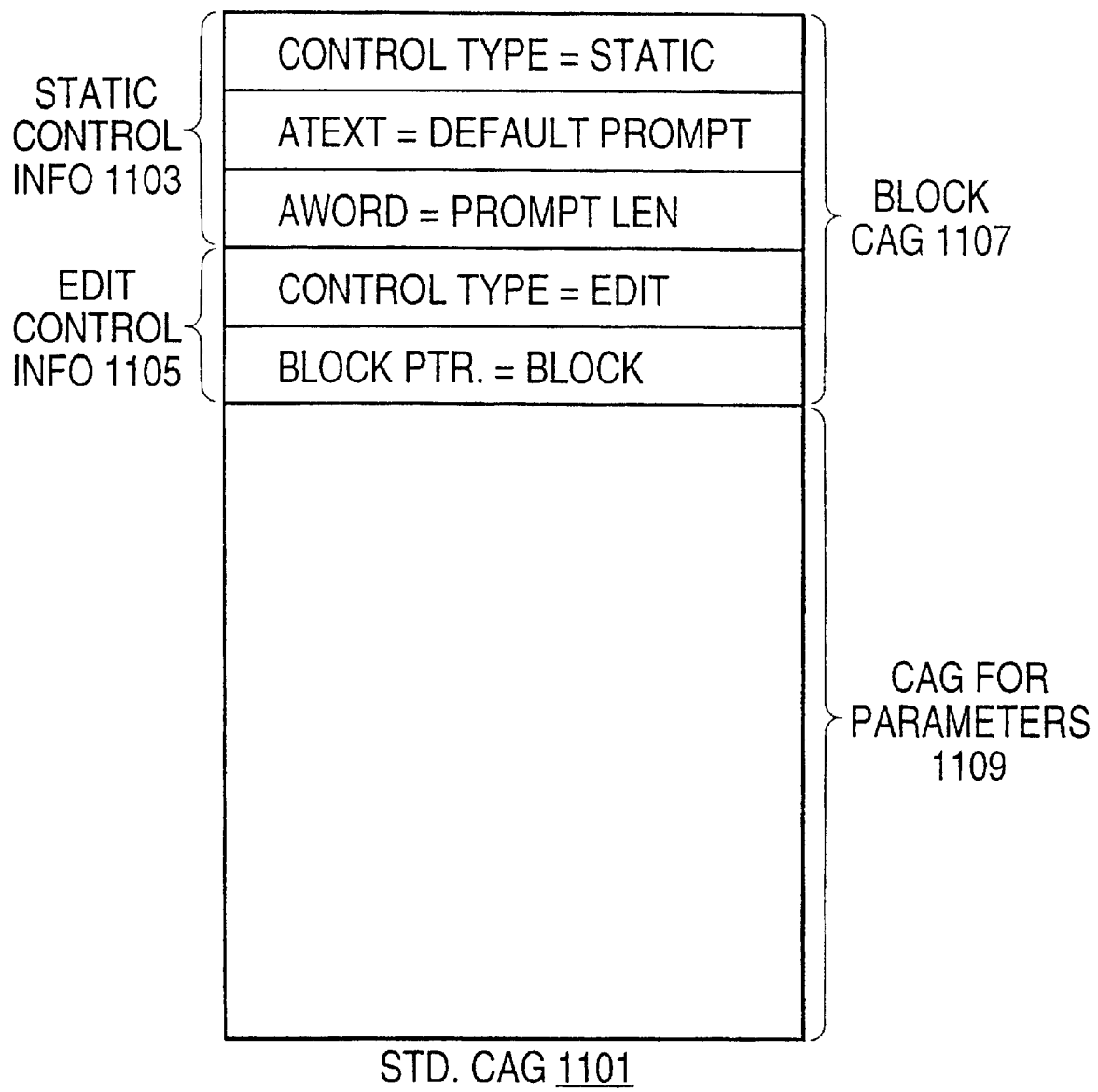
FIG. 11 is a diagram of standard control and glue.

FIG. 11 shows the default controls and glue data structure 1101 that all blocks use before the metaphor is customized. Structure 1101 has three main divisions: static control information 1103, edit control information 1105, and controls and glue for parameters 1109. Static control information 1103 is for "read only" information that appears in the form, for example prompt texts. Edit control information 1105 is for information that may be edited, for example fields into which the user of the form inputs values for the parameters. If the block has parameters, CAG for parameters 1109 contains control and glue information for those parameters. Static control information 1103 and edit control information 1105 together make up block control and glue information 1107. Only those fields and their values are shown which are set when block control and glue 1107 is created. Thus, in static control information 1103, the type of the control information is specified, Atext is set to the default prompt, which is the name of the construct represented by the block (obtained from information in the block itself, and AWORD is set to the length of the default prompt. Similarly, in edit control information 1105, blockptr 1029 is set to point to block 825. The remainder of the values are set as the block's parameters are processed and when the window associated with the form is set up. In control and glue information 1109, each block that represents a parameter has a block CAG 1107; if the block CAG 1107 requires additional information, for example, for radio switches for an enumerated type, it will include a pointer to control and glue for the additional information in form details 913.

Figure 12:
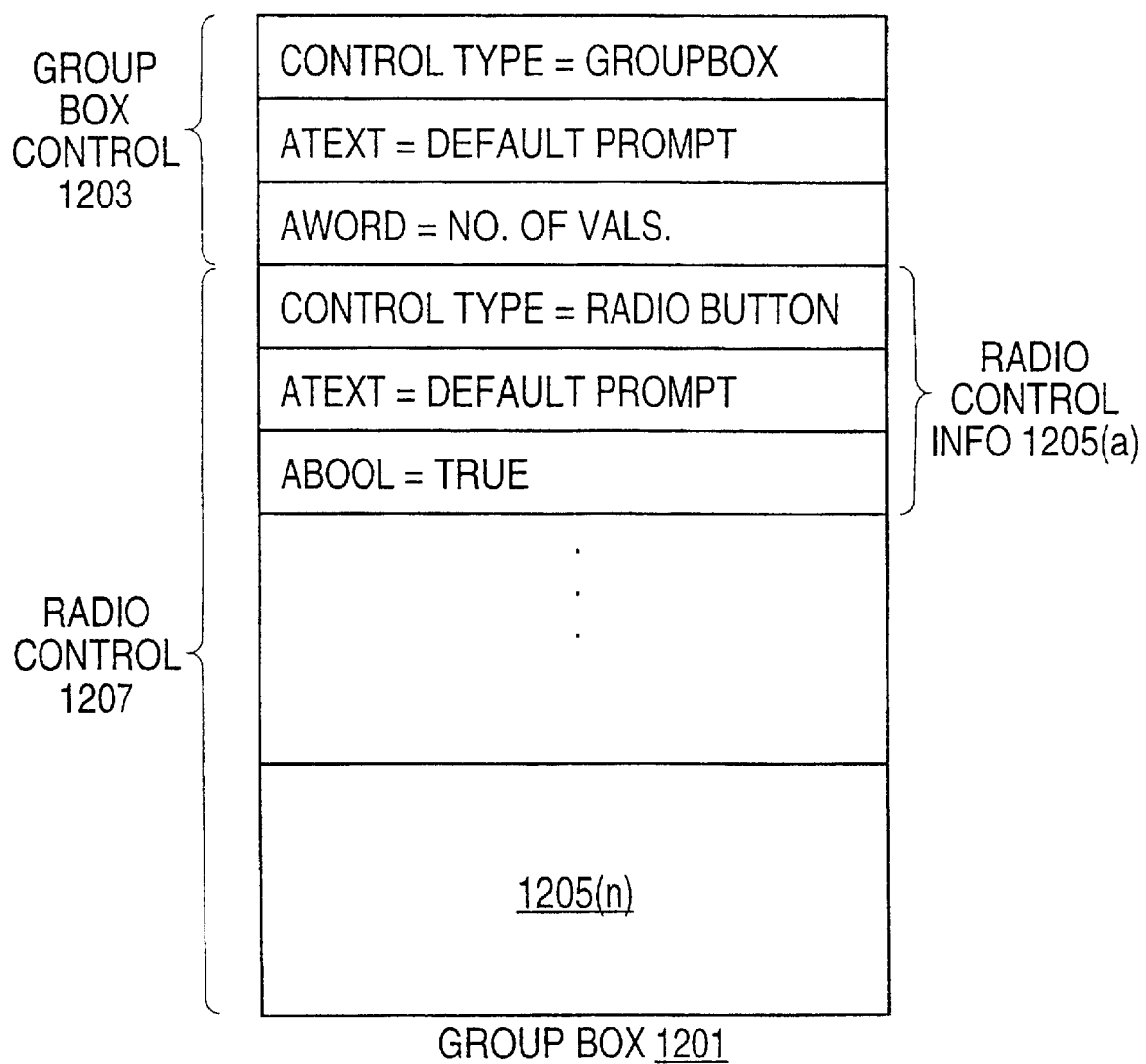
FIG. 12 is a diagram of a group box.

FIG. 12 shows a group box 1201, one of the data structures which may be found in form details 913. Group box 1201 is used when a parameter has an enumeration type. Group box 1201 is of course made up of control info data structures 905 and line of controls data structures 907 made of the control info data structures. Here, there are two lines of control data structures: group box control 1203, which contains control information for the group box as a whole, and radio control 1207, which contains radio control information 1205 for each of the possible values of the enumeration type.

Continuing in more detail, the values in the single control info structure making up group box control 1203 that are set when group box 1201 is created are the control type, the default prompt for the set of possible values, and the number of possible values in the set. There is radio control info 1205 for each of the possible values. Each item 1205 contains the control type, in this case RADIO BUTTONS and the default prompt, which is the name of the value. The first and last items of radio control info 1205 have ABOOL set to TRUE to mark the start and end of the list.

Figure 13:
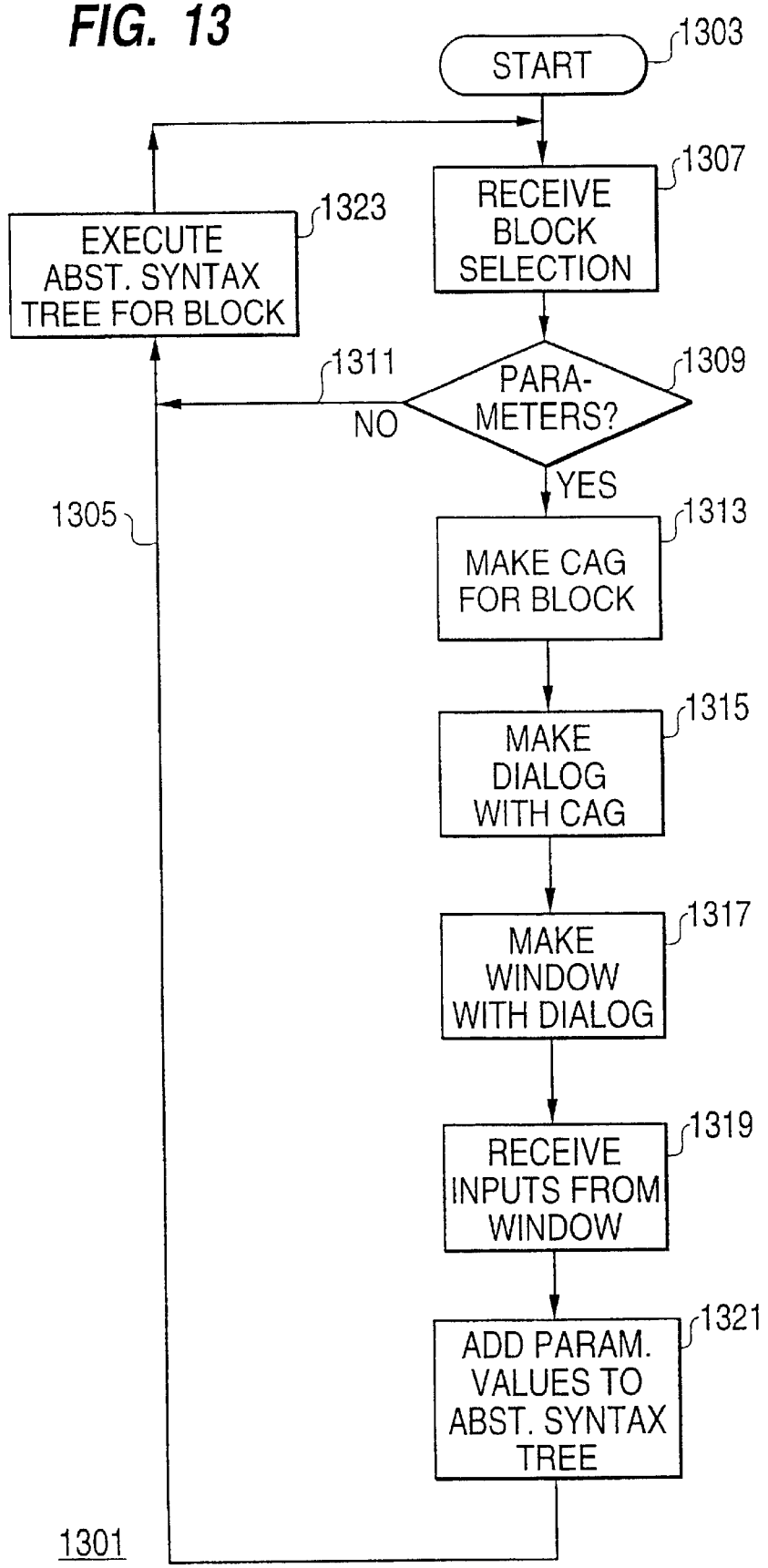
FIG. 13 is a flow chart of how a forms metaphor is used.

Operation of a Form Metaphor: FIG. 13

FIG. 13 is a flow chart 1301 of the operation of a form metaphor. Operation begins when a block 825(*i*) is selected, either interactively by a user who selects the programming construct corresponding to the block for execution or because the block belongs to another syntax tree and has been reached in the course of the execution of that syntax tree. In Braid, "execution" may mean execution of the syntax tree in any of the various execution environments. Metaphor interpreter 815 corresponding to the kind of form and the kind of GUI executes a loop 1305. In each iteration of the loop, interpreter 815 receives a message from IUI 807 indicating selection of block 825(*i*) at 1307. At 1309, the interpreter examines block 825(*i*) to determine whether it has parameters. If it has none, branch 1311 is taken and the abstract syntax tree for block 825(*i*) is executed. Otherwise, the next step is 1313, in which the interpreter uses form builder function 902 to make the controls and glue 903 associated with the block and with all of the block's parameters. Controls and glue 903 are used to make a controls and glue dialog at step 1315, that is, the interpreter adds information needed to make a window in the given GUI, then the interpreter makes a window in IUI 807 with the dialog. The user inputs parameter values via the window, as shown at 1309, and interpreter 815 adds the parameter values to the abstract syntax tree for the block at 1321. The abstract syntax tree is then executed with the parameter values at 1323, while interpreter 815 waits for the next message. Of course, Construction of a CAG for the Block In a preferred embodiment, controls and glue for the block are constructed dynamically after receipt of the message selecting the block. Construction is done by means of construction functions for the different kinds of parameters represented by the blocks which are children of the selected block. If the metaphor is a default metaphor, i.e. has not been modified, construction begins with the execution of a stdBuildForm function that takes a pointer to the block as its parameter. The function makes a new controls and glue data structure 903 for the block. If the block has no parameters, the function does nothing; if it has parameters, it constructs a standard CAG 1101, first making block CAG 1107 and then making a CAG for each of the parameters and adding it to CAG for parameters 1109. The function used for each of the parameters varies according to the type of the parameter. For example, if the parameter has an enumeration type, the function for the parameter builds a group box 1201. In a preferred embodiment, a form for a construct is customized by making a new build form function for the construct. For example, stdBuildForm simply uses the block name as the default parameter; if a prompt that is better suited to the desired interaction between the user and the form is needed, a new build form function can be made that uses a predefined string for the prompt.

Constructing a Dialog for the Block

The term dialog refers to the fact that the dialog adds the information which is required in addition to the controls and glue to make an interactive window. In a preferred embodiment, the dialog is made by a C++ constructor which takes as parameters a pointer to a windows object which will be the parent window for the form for the block, an identifier for the window to be made, a pointer to the block, the controls and glue for the block, and a module. The constructor adds variables for window features such as the cursor, the thumb, and the scrolling range. An initialization function then initializes the fields in control and glue 1101 that relate the controls and glue to the window for the form. What is done in each case is determined by the type of the control information.

For example, the initialization function for static control info 1103 function sets ID field 1005 to a control ID, sets cursor x 1009 and cursor y 1011 to initial values, sets width 1013 so that the form will take the longest text line and height to a default value of 18, sets windows parent pointer 1003 to the window from which the block was selected, and sets a windows control data structure in GUI-specific info 922 from the values in ID field 1005, Atext field 1007, cursor position fields 1009 and 1011, width and height fields 1013 and 1015, and AWord field 1019. The windows control data structure is then used to create a window in the Microsoft Windows GUI. Information from controls and glue for each of the control and glue data structures for the parameters for the block to which the STATIC control information belongs is similarly used to produce child windows for the parameters in the window for the block to which the STATIC control information belongs. How a dialog is constructed win of course also vary for the GUI that the dialog is intended for.

Adding Parameter Values to the Parse Tree

Once the window for the form has been constructed, IUI 807 displays it in the usual fashion for the GUI in which the window is implemented. The user inputs parameter values for the programming construct by either selecting a value or writing a value to a field. When the user is done, the user so indicates in the style required by the GUI (for example by clicking on an OK or ENTER button) and IUI 807 returns the selected and inputted parameter values to metaphor interpreter 815 as part of the windows control information associated with the controls and glue for the window. Metaphor interpreter 815 takes the parameter values and writes them into the abstract syntax tree for the programming construct.

As described about with regard to FIG. 7, the value of one programming construct may be a parameter value for another programming construct. In that case, the forms metaphor displays the form for the programming construct which is the value with an arrow from that form to the field of the form for the programming construct which is to receive the value. In a preferred embodiment, when there is this kind of relationship between forms, the windows control information includes a pointer to the dialog for the programming construct which is the source of the value and this pointer is used to obtain the value of the programming construct which is the parameter and install it in the parse tree for the programming construct that is receiving the parameter value. Once the parameter values have been installed in the parse tree, the parse tree can be executed in the manner that is appropriate for the execution environment specified by the user.

Figure 14:
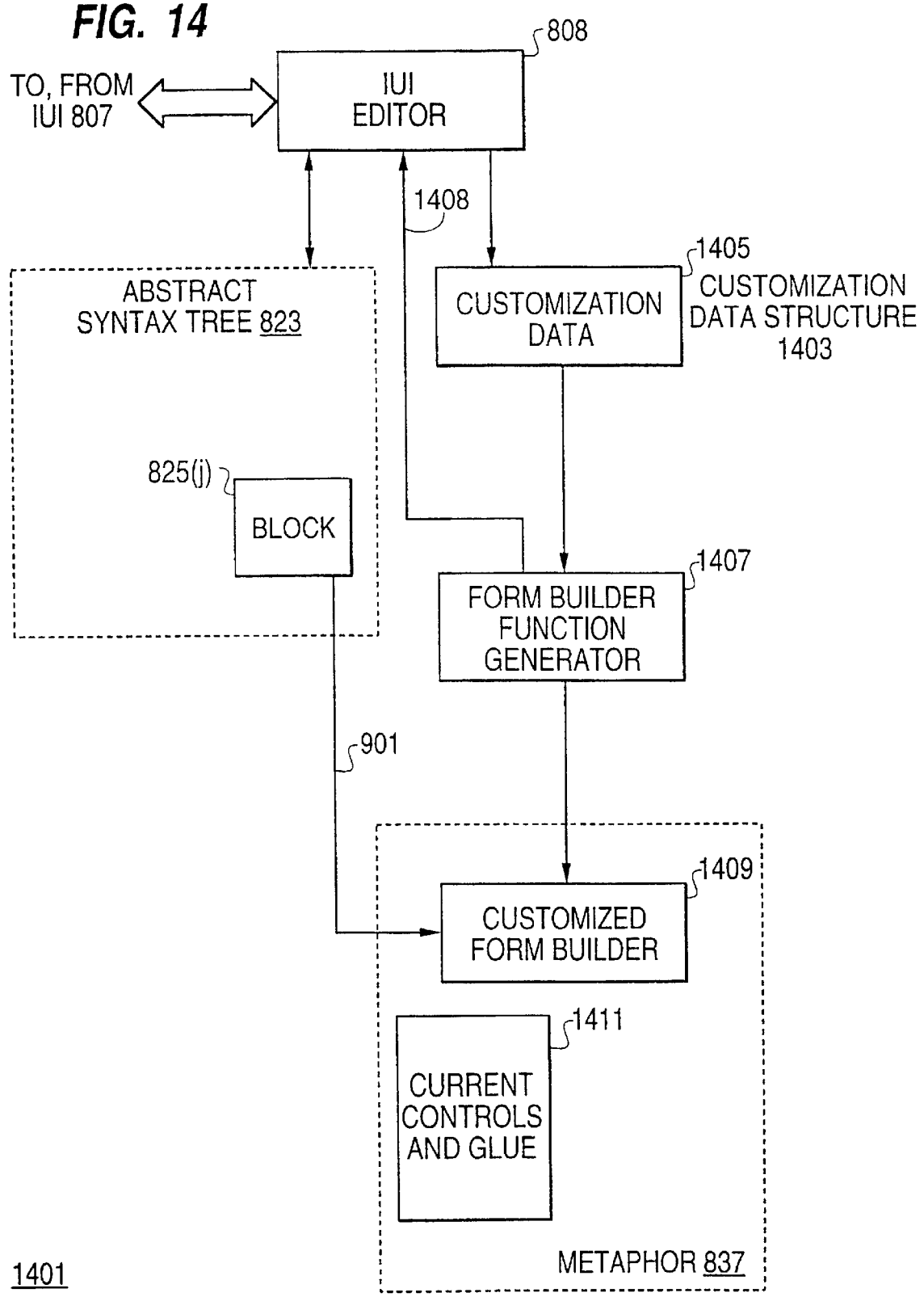
FIG. 14 is a diagram of a system for customizing a forms metaphor.

Customizing Forms: FIG. 14

FIG. 14 shows a system 1401 for customizing a form. System 1409 makes a customized form builder function 1409 and replaces the default form builder function for the programming construct with customized form builder function 1409. Customized form builder function 1409 could of course be build by hand, but system 1401 permits the programmer to interactively edit the current form and then uses information from the edited form to automatically generate form builder function 1409.

To edit the current form, the programmer uses interactive interface editor 808, which may be a standard interface editor provided by the GUI, as described above. As far as editor 808 is concerned, the form for block 825(j) is a window like any other, and can be edited by editing the window's resources, that is, data values which determine the appearance of the window. In the case of the form for block 825(j), these resources are contained in current controls and glue 1411, which of course was built by the current form builder function, and in abstract syntax tree 823. Thus, IUI editor 808 causes IUI 807 to display the current form on display 805 and the programmer can edit the form interactively using inputs from pointing device 802 and keyboard 803. The editing is of course limited to those attributes of the form which are defined in controls and glue 903.

After the programmer has edited the current form, IUI editor 808 outputs the new values for the controls and glue to customization data structure 1403. The new values make up customization data 1405 in the data structure. Data structure 1403 serves as input to a form builder function generator 1407 which generates customized form builder function 1409 in metaphor 837 for block 825(j) and returns a pointer to form builder function 1408 to IUI editor 808, which replaces pointer 901 in block 825(j) which pointed to the old form builder function with the pointer to form builder function 1408. The next time block 825(j) is selected, customized form builder 1409 will be used to make controls and glue 1411 and the forms made using the information in controls and glue 1411 will of course reflect the changes made by the programmer. If further customization is needed, system 1401 can be again used as just described.

Using Metaphors in Other Programming Environments: FIG. 15

The techniques described above for making and using metaphors may be adapted for use in programming environments other than Braid. The basic requirement is that the programming environment provides information about a programming construct that permits generation of a user interface for the programming construct. The kinds of information that can be used include the abstract syntax tree, as with Braid, the source code, a user-provided list of function interfaces, and information gathered by a debugging system. When such information is available, a form construction function can be associated with the programming construct and can be used as described above to read the information and generate information that is equivalent to the controls and glue information, and that information can be used in turn to generate the form for the programming construct. The form can further be customized in the manner just described, using whatever tools are provided by the programming environment and making any changes required by the environment. Programming environments in which metaphors are particularly useful include those for the C language, the C++ language, and Java. As with Braid, the form for a programming construct may be used to obtain values for the construct's parameters when a user selects the construct for execution or when the construct is selected by being involved in the execution of another program.

FIG. 15 shows how metaphors can be used in a C++ programming environment to greatly simplify the generation of user interfaces. In the C++ environment, the forms metaphor would be implemented as a C++ library. FIG. 15 shows a C++ main function 1501 which involves two objects: an object c 1505 of class c 1503 and an object wIn of class Winstream 1507. Class Winstream 1507 is a class that represents a graphical display capable of displaying forms such as those produced by form metaphors.

Among the things that class C defines for objects having its class are modifiable metaphors. As with Braid, the class provides default metaphors, and the programming environment provides tools for modifying metaphors. Class c also defines two operators involving metaphors: >> 1511 and << 1515. The syntax for the >> operator is the following:

<Winstream object> >> <class C object>

This operator causes a form to be generated using the class C object's forms metaphor in the Winstream object from which the class C object can receive parameter values. The << operator outputs the result of processing of the class C object in the Winstream object using the class C object's forms metaphor.

Thus, at 1513, the C++ code causes the display object specified by wIN to display an input form specified for c (the form may be either the one defined for the C class or one that has been customized for the c object), and at 1515, the C++ code causes the wIn display object to display an output form specified for c. As the code demonstrates, metaphors are able to completely hide the complexities of graphical user interfaces from the C++ programmer. Additionally, as described above, the graphical user interface can be customized for any programming construct, be it class or object, and the graphical user interface for the programming construct automatically tracks changes in the programming construct.

Conclusion

The foregoing Detailed Description has disclosed to those skilled in the programming arts how to make metaphors and how to use them to simplify the work of providing and modifying a user interface for a program, to ensure that the user interface tracks changes in the program that affect the user interface, and to simplify the work of providing user interfaces for the program that will work not only with different kinds of user interface systems. The techniques disclosed in the Detailed Description are the best presently-known to the inventors for implementing metaphors.

As will be immediately apparent to those skilled in the computer arts, there are many other ways of implementing and using metaphors. What gives a metaphor its advantages over prior techniques for making user interfaces for programs are the fact that the metaphor is associated with a programming construct, the fact that many different metaphors may be associated with a programing construct, the fact that the metaphor uses information from a description of the programming construct to make the interface, and the fact that individual metaphor may be modified. Some implementations of metaphors will have all of these characteristics; others will not. For example, some implementations may have metaphors for only a single user interface.

There are further many ways other than the ones disclosed herein of implementing systems of making user interfaces that have some or all of the above characteristics. For example, in the preferred embodiment, the metaphor is implemented by means of a build function that reads the information from the programming construct that is needed to make the interface, and the metaphor is modified by replacing the build function with a different build function. In other embodiments, the programming tool that makes the description of the programming construct may also generate a data structure that contains the information used to make the interface and the interface may be edited by editing the data structure. Similarly, in programming environments in which the abstract syntax tree is not involved in the execution of a program, parameter values may be provided directly to an execution of the construct, rather than being incorporated into the abstract syntax tree.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. A programming construct user interface generator which generates a plurality of interactive user interfaces for a programming construct, the generator comprising:

a description of the construct, the description being usable to generate code; a plurality of interactive user interface metaphors, a metaphor corresponding to an interactive user interface and being associated with the description; and a generating routine that, in response to a use of the description to generate code, generates code for a specified one of the interactive user interfaces for the construct using the description and the metaphor that is associated with the description and corresponds to the specified interactive user interface.

2. The generator set forth in claim 1 further comprising:

a metaphor modification interface that permits modification of one of the metaphors and thereby modifies the corresponding interactive user interface.

3. The generator set forth in claim 1 wherein:

the plurality of user interfaces includes one or more textual user interfaces.

4. The generator set forth in claim 1 wherein:

the plurality of user interfaces includes one or more graphical user interfaces.

5. The generator set forth in claim 1 wherein:

the plurality of interactive user interfaces includes a plurality of graphical user interfaces, the graphical user interfaces including ones thereof that correspond to different graphical user interface systems.

6. A programming construct user interface generator which generates an interactive user interface for a programming construct, the generator comprising:

a description of the construct, the description being usable to generate code;

an interactive user interface metaphor that is associated with the description and that corresponds to an interactive user interface;

a metaphor modification interface that permits modification of the metaphor; and a generating routine that, in response to a use of the description to generate code, uses the metaphor and the description to generate code for the interactive user interface for the program construct using the description and the metaphor corresponding to the interactive user interface.

7. The programming construct user interface generator set forth in any one of claims 1, 2, 3, 4, 5, or 6 wherein:

the interactive user interface receives parameter values from the user, the parameter values being used in executing the programming construct.

8. The programming construct user interface generator set forth in any one of claims 1, 2, 3, 4, 5, or 6 wherein:

the metaphor includes a function that the generating routine uses to obtain information from the description.

9. The programming construct user interface generator set forth in any one of claims 1, 2, 3, 4, 5, or 6 wherein:

the generating routine generates the specified interactive user interface upon activation of the programming construct.

10. The programming construct user interface generator set forth in any one of claims 1, 2, 3, 4, 5, or 6 wherein:

the generating routine is a compiler which generates object code for the specified interactive user interface upon compilation of the construct.

11. The programming construct user interface generator set forth in any one of claims 1, 2, 3, 4, 5, or 6 wherein:

the programming construct is a class definition; and an interactive user interface metaphor associated with the description is inherited by program constructs that are defined using the class definition.

12. The programming construct user interface generator set forth in anyone of claims 1, 2, 3, 4, 5, or 6 wherein:

the description of the construct is an abstract syntax tree.

13. The programming construct user interface generator set forth in claim 12 wherein:

the interactive user interface receives parameter values from the user; and the generating routine adds the parameter values to the abstract syntax tree.

14. The programming construct user interface generator set forth in claim 13 wherein:

the programming construct is executed by interpreting the abstract syntax tree after the parameter values have been added.

15. A data storage device that is usable in a computer system, the data storage device being characterized in that:

the data storage device contains a program which, when executed in the computer system, implements the apparatus set forth in anyone of claims 1, 2, 3, 4, 5, or 6.

16. The programming construct user interface generator set forth in any one of claims 1, 2, 3, 4, 5, or 6 wherein:

the metaphor includes a function that the generating routine uses to obtain information from the description; and the metaphor modification interface modifies the metaphor by modifying the function.

17. A method of generating a plurality of interactive user interfaces for a programming construct, the method being implemented in a computer system and comprising the steps of:

associating a plurality of interactive user interface metaphors that correspond to the plurality of interactive user interfaces with a description of the programming construct, the description being usable to generate code; and in response to a use of the description to generate code, generating code for a specified one of the interactive user interfaces for the construct using the description and the metaphor that is associated with the description and corresponds to the specified interactive user interface.

18. A method of generating an interactive user interface for a programming construct, the method being implemented in a computer system and comprising the steps of:

associating an interactive user interface metaphor that corresponds to an interactive user interface with a description of the programming construct;

modifying the interactive user interface metaphor; and in response to a use of the description to generate code, generating the interactive user interface for the program construct using the description associated therewith and the metaphor as modified, the modified metaphor corresponding to the interactive interface, whereby the modified metaphor automatically tracks changes in the description.

19. A data storage device that is usable in a computer system, the data storage device being characterized in that:

the data storage device contains a program which, when executed in the computer system, performs the method set forth in any one of claims 17 through 18.

* * * * *